US009624642B2

(12) United States Patent
McDonald

(10) Patent No.: US 9,624,642 B2
(45) Date of Patent: Apr. 18, 2017

(54) EXCAVATING APPARATUS EMPLOYING SWIVEL ADAPTER WITH GEAR BEARINGS HAVING GEARS WITH DIVERGENT THICKNESS

(71) Applicant: Jason Wayne McDonald, High Point, NC (US)

(72) Inventor: Jason Wayne McDonald, High Point, NC (US)

( * ) Notice: Subject to any disclaimer, the term of this patent is extended or adjusted under 35 U.S.C. 154(b) by 357 days.

(21) Appl. No.: 14/148,013

(22) Filed: Jan. 6, 2014

(65) Prior Publication Data
US 2015/0191892 A1    Jul. 9, 2015

(51) Int. Cl.
*F16C 19/36* (2006.01)
*E02F 3/36* (2006.01)
*F16C 19/30* (2006.01)

(52) U.S. Cl.
CPC ............ *E02F 3/3681* (2013.01); *F16C 19/30* (2013.01); *F16C 19/36* (2013.01); *Y10T 403/32975* (2015.01)

(58) Field of Classification Search
CPC .......... E21B 19/00; E21B 19/07; E21B 19/16; F16C 19/26; F16C 19/30; F16C 19/40; F16C 33/34; F16C 33/36; F16C 33/306; F16C 33/363; F16C 33/385; F16H 48/08; F16H 2048/387; F16H 2048/087; F16H 2048/085; E02F 3/3681; Y10T 403/32975
USPC ............. 81/57.18, 57.21; 279/4.06; 384/450, 384/550, 554, 555, 565; 475/246, 230
See application file for complete search history.

(56) References Cited

U.S. PATENT DOCUMENTS

| | | | | |
|---|---|---|---|---|
| 141,129 A * | 7/1873 | Eccles | ..................... | F16C 19/30 |
| | | | | 384/550 |
| 715,171 A * | 12/1902 | Stilson | ..................... | F16C 19/36 |
| | | | | 384/550 |
| 1,222,534 A * | 4/1917 | Cormier | ................ | F16C 33/306 |
| | | | | 384/550 |
| 3,760,469 A * | 9/1973 | Brown | .................... | E21B 19/07 |
| | | | | 279/4.06 |
| 3,872,741 A * | 3/1975 | Berchtold | ............... | F16H 48/08 |
| | | | | 475/230 |
| 3,938,865 A * | 2/1976 | Rouverol | ................ | F16C 19/22 |
| | | | | 384/550 |
| 3,998,506 A * | 12/1976 | Traut | ...................... | F16C 19/26 |
| | | | | 384/550 |
| 4,629,340 A * | 12/1986 | Provost | ................... | F16C 19/26 |
| | | | | 384/450 |
| 2009/0097794 A1* | 4/2009 | Higgins | ................ | F16C 33/306 |
| | | | | 384/565 |

* cited by examiner

*Primary Examiner* — Robert Pezzuto
(74) *Attorney, Agent, or Firm* — Robert W. Pitts

(57) ABSTRACT

An apparatus for swiveling an implement, such as a bucket, relative to a device, such as an excavator boom, includes a rotary union and a bearing disc mounted in a housing. The bearing disc rotates relative to the housing so that the implement can be rotated relative to the device. A gear or geared bearing assembly is located between the bearing disc and top and bottom housing portions for bearing loads transverse to the axis about which the implement is rotated relative to the device. The rotary union has fluid passages extending from the top to the bottom of a central shaft, which is affixed to the bearing disc, and the shaft and disc can comprise a one piece combination rotary union and bearing disc.

15 Claims, 14 Drawing Sheets

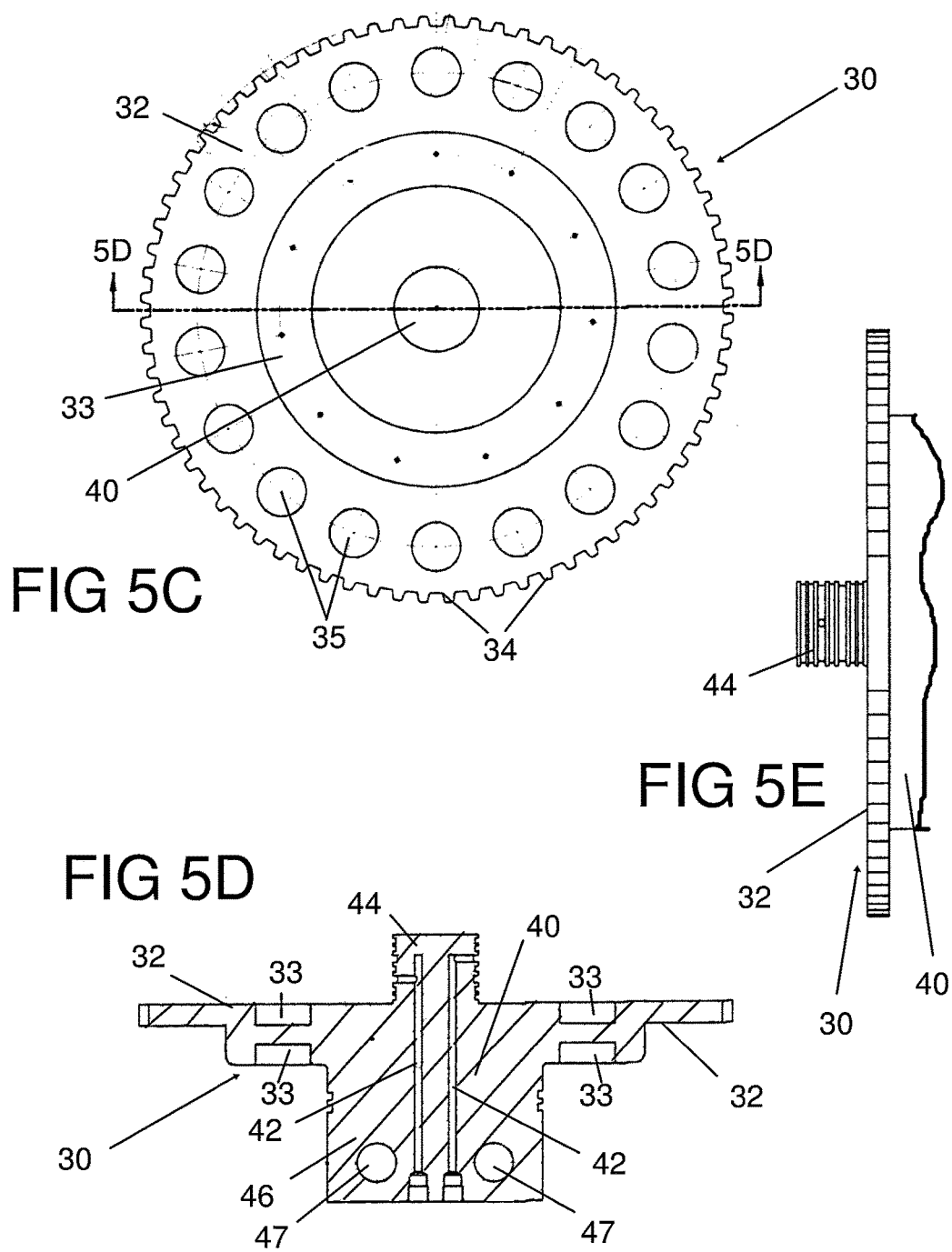

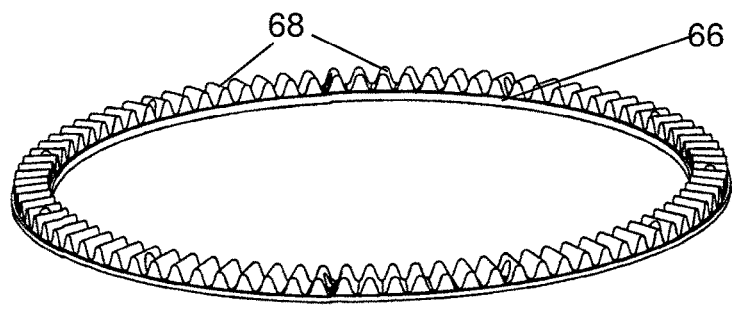
FIG 7A
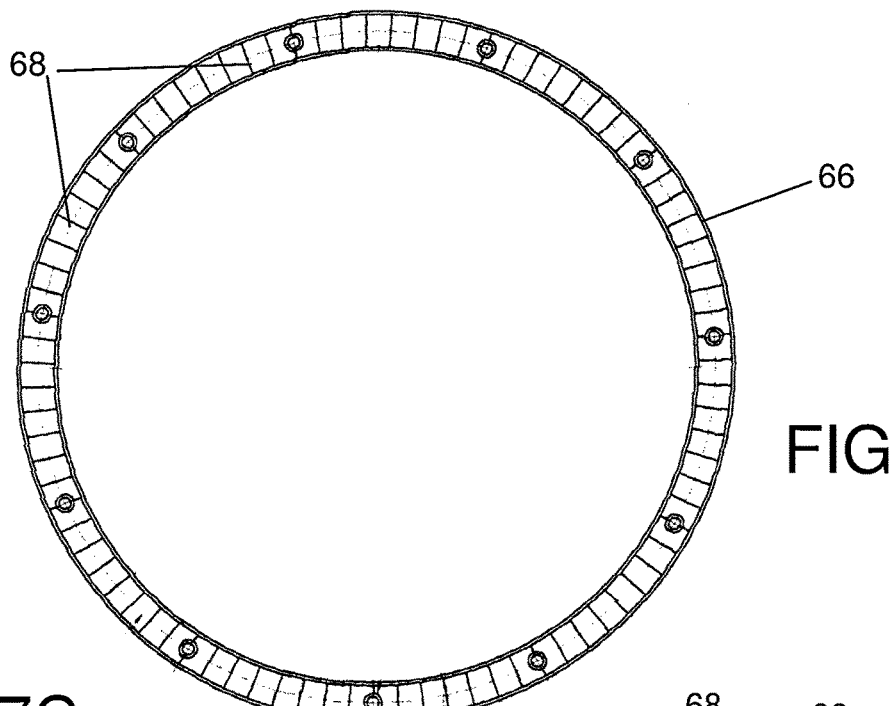
FIG 7B
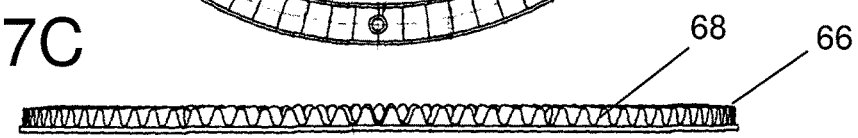
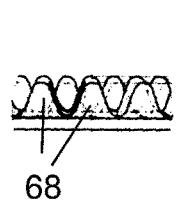
FIG 7E
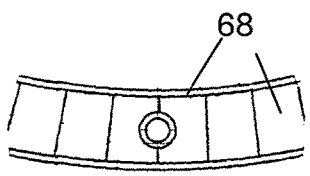
FIG 7D

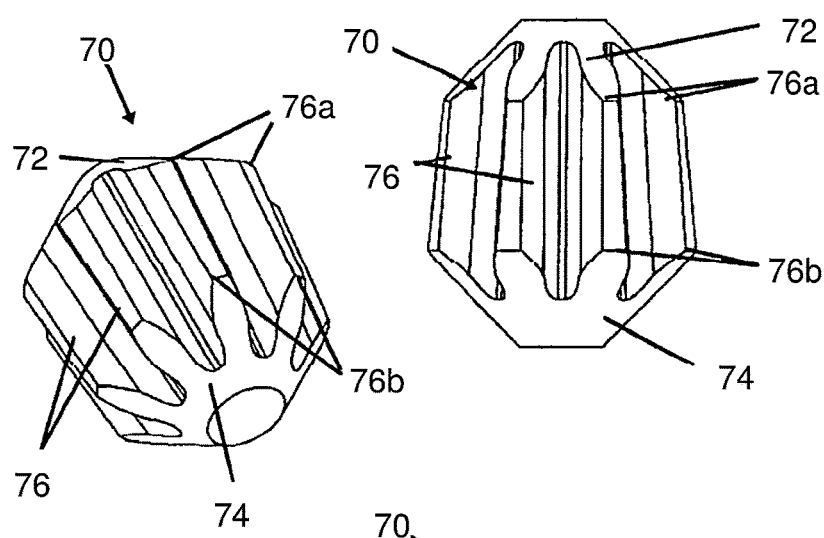
FIG 8E
FIG 8F
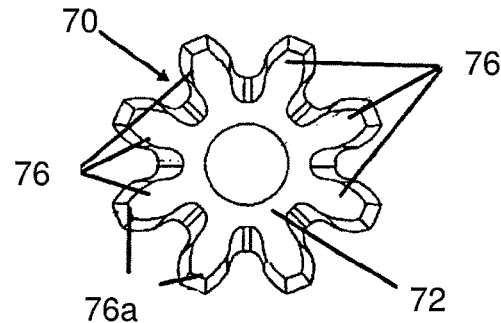
FIG 8G

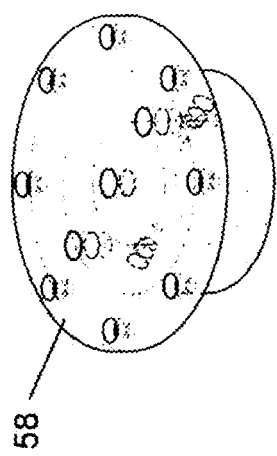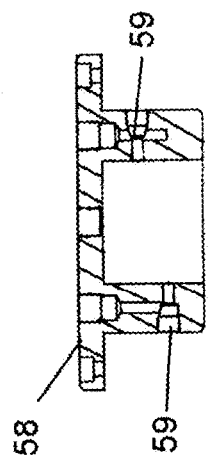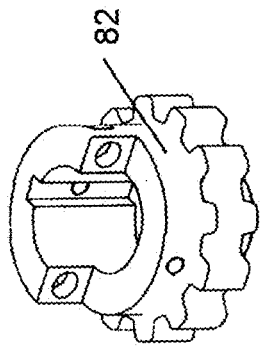

EXCAVATING APPARATUS EMPLOYING SWIVEL ADAPTER WITH GEAR BEARINGS HAVING GEARS WITH DIVERGENT THICKNESS

CROSS REFERENCE TO PRIOR CO-PENDING APPLICATIONS

This application is a Divisional of U.S. patent application Ser. No. 13/845,710 filed Mar. 18, 2013 which is in turn a Continuation-in-part of co-pending U.S. patent application Ser. No. 13/530,324 filed Jun. 22, 2012, which also claims the benefit of previously filed, co-pending U.S. Provisional Patent Application 61/571,168 filed Jun. 22, 2011.

BACKGROUND OF THE INVENTION

Field of the Invention

This invention relates to a swivel adapter mount that can be used between a device and implement, such as with excavating equipment, such as a backhoe or excavator. A bucket of other implement can then be moved to positions that would not be possible with a conventional backhoe or similar device. This invention is also related to bearing assemblies that will operate in such an environment with a relatively long service life.

Description of the Prior Art

Conventional backhoes and crawler type excavators are not suited for digging ditches with sloping sides. These types of conventional excavating equipment do not have the ability to tilt or swivel a bucket or claw so that a slope can be graded. Therefore a separate piece of equipment, such as a device with a telescoping boom and tilted claw, such as the type manufactured by Gradall are typically employed.

The instant invention provides a swivel adapter mount that allows a bucket to be tilted so that a slope can be graded by using a backhoe, a crawler type excavator or similar piece of equipment.

There have been earlier devices that are intended to tilt or swivel an excavating bucket for use in grading a slope. However, these devices have not proven to be effective. In some cases they require a large number of component parts and are therefore costly both to manufacture and to repair. The more parts that are necessary than the chance then the greater the chance of a break down if other things are equal. Others have not proven to be sturdy enough for use in the field.

Most of these prior art devices employ hydraulic means to rotate a bucket through and angle of approximately forty-five degrees. If these devices could rotate through three hundred sixty degrees or be capable of continuous rotation, they could be employed with implements other than buckets and could greatly expand the versatility of backhoes, crawler excavators or similar commonly available equipment.

Mechanisms to tilt or swivel a bucket on the end of an excavating boom have been discussed in U.S. Pat. Nos. 5,515,626; 5,561,926; 6,146,082; 6,539,650; and in International Published Patent Application WO 2007/097698. However, none of these approaches is believed to be as versatile and reliable as the swivel adapter mount of the instant invention.

SUMMARY OF THE INVENTION

An apparatus according to this invention is used to rotate an implement, for example a bucket, relative to a device, for example an excavating device. The apparatus includes a housing and a disc. The disc and the housing are rotatable relative to each other about a central axis extending through the housing and the disc and through the implement and the device when the housing and disc are mounted between the implement and the device. The implement can be swiveled relative to the device. A bearing assembly is positioned between the housing and rotating disc and around the central axis about which the rotating disc and the housing are relatively rotatable. The bearing assembly includes opposed geared bearing races and geared bearings. A first bearing race is fixed to the disc and a second bearing race is fixed to the housing. Each of the opposed bearing races have radially spaced, opposed inclined bearing surfaces extending around the central axis. A circular race gear is radially positioned between the opposed truncated inclined bearing surfaces. The inclined bearing surfaces extend beyond the cylindrical gear. The circular race gear has radially diverging race gear teeth aligned with projections transversely radiating from the central axis. A plurality of rotatable geared bearings are positioned around the opposed bearing races. Each rotatable gear or geared bearing has two, oppositely facing conical bearing surfaces at each end of the rotatable geared bearing. The rotatable gear or geared bearings are positioned between opposed bearing races so that the oppositely facing conical bearing surfaces on the geared bearings engage the inclined bearing surfaces on the opposed bearing races. Each gear or geared bearing also includes divergent geared bearing teeth disposed around each geared bearing between oppositely facing conical bearing surfaces. The divergent gear or geared bearing teeth are progressively radially thicker so that the divergent geared bearing teeth will mesh with the diverging race gear teeth on the circular race gear. The bearing assembly will bear loads transverse to the central axis as the implement is rotated relative to the device about the central axis.

According to another aspect of this invention the apparatus is actuated by fluid pressure to rotate an implement, such as an excavating bucket, relative to a device about a central axis. the apparatus comprising. The apparatus includes a housing attachable to the device and a cylindrical shaft extending through the housing and attachable to the implement. A disc is affixed to cylindrical shaft with the cylindrical shaft extending axially beyond the disc. The disc is rotated with the cylindrical shaft relative to the housing by the application of fluid pressure supplied from the device so that the implement is rotatable relative to the device. The shaft and the disc are rotatable relative to the housing around the central axis. A bearing assembly for supporting loads transverse to the central axis is positioned between the housing and the disc. The bearing assembly extends around the cylindrical shaft, with the bearing assembly including bearing races on the disc and on the housing, and bearings disposed in the bearing races around the cylindrical shaft. Fluid passages extend parallel to the central axis through the shaft so that the shaft comprises a rotary union so that fluid pressure can be transmitted through rotary union from the device for further manipulation of the implement about axes transverse to the central axis in addition to rotating the disc and the implement about the central axis.

This apparatus can be mounted on an excavating device in which an implement can be rotated relative to an excavating boom on the excavating device about multiple perpendicular axes in response to fluid pressure supplied by the excavating device. The apparatus includes a housing attachable to the excavating boom and a combination rotary union and bearing disc mounted to the housing and rotatable relative to the housing about a first axis upon the application of hydraulic fluid pressure supplied by the excavating device. The combination rotary union and bearing disc is also attachable to the implement. Fluid passages extend through the combination rotary union and bearing disc so that hydraulic fluid pressure can be supplied to an another fluid powered actuation component for rotating the implement about a second axis. A bearing assembly is located between the bearing disc and the housing for bearing loads transverse to the first axis. The bearing assembly extends around a portion of the combination rotary union and bearing disc, and further comprises bearing races on the bearing disc and on the housing with a plurality of bearings disposed in the bearing races.

When used with an excavator or a wheeled backhoe, a swivel apparatus according to this invention can not only improve more efficient use of excavating devices on a worksite, but it can also improve safety by preforming operations, the would otherwise require workers to preform excavating tasks in a ditch, where accidents are more likely to happen. The additional range of motion be allowing an implement, such as a bucket, to be swivel and tilt about perpendicular axes, in addition to normal rotation, will allow a single excavating device to perform multiple tasks. For example, an excavating device with the capabilities of the instant invention would all an operator to maneuver around pipe culverts dig and remove earth from beneath a pipe and to work around trees, pipe lines, fire hydrants and other obstacles. An operator can also use an excavator employing these capabilities to handle slopes from 1:1, 2:1, and 3:1 without moving the excavating device. A person will not then need to do such a potentially dangerous task in a ditch. Furthermore, a single excavating device with the capabilities of this invention, can dig from different directions, so that multiple excavating device would not be needed to dig a single ditch, nor would it be necessary to reposition the main excavating device. By swiveling and tilting an implement, the operator could also level bedding stone that might be required, and other tasks could also be performed. Although not limited in principle, an excavating device according to this invention would be suitable for a 75,000 pound excavator or wheeled backhoe.

An excavating device or the representative embodiment depicted herein provides the ability to rotate an implement, such as a bucket for 360 degrees in either direction as well as tilting the implement 90 degrees in either direction for a total of 180 degrees. Such an excavating device will minimize the need for specialty equipment and enhance profitability. An excavating device incorporating this invention is well suited for jobs, such as working on slopes, leveling ground, precise backfilling and quick profiling utilities, clearing land and landscaping.

The bearing assembly of this invention is not limited to use with excavating equipment and is especially suited for heavy duty and high load operations. This bearing assembly reduces micro chatter and eliminates rotational wobble to create smooth and precise control. The bearing housing oil is filled, which provides superior lubrication, minimizes wear and leads to longer life. This bearing assembly provides precise control with rifle-true anti-backlash resulting in smoother operation and excellent control. The bearing assembly also provides am improved thrust bearing with gear teeth providing superior thrust bearing performance. The bearing assembly also excellent speed reduction, and through phase tuning it allows differentiation in the number of teeth that must be engaged between input and output, which enables successful reduction rations. Less noise and vibration is the result of evenly distributed bearing loads reducing rough spots. The bearing assembly is also structurally rigid and provides excellent overall load capacity. The number are reduced as well as weight and size in addition to increases load capacity and excellent performance.

BRIEF DESCRIPTION OF THE DRAWING

FIG. 3A is a view of the bottom or interior surface of the top housing. FIG. 3B shows the top or exterior surface of the top housing. FIG. 3C is an elevational view, taken along lines 3C-3C in FIG. 3B, showing interior recesses of the top housing.

FIG. 4A shows the top or interior surface of the bottom housing. FIG. 4B is an elevational view, taken along lines 4B-4B in FIG. 4A, showing interior recesses of the bottom housing, which together with the recesses shown in FIG. 3C will receive the combination rotary union and bearing disc and the bearing components.

FIGS. 5A-5E are views of the combination rotary union and bearing disc that will be mounted on the interior of the housing. FIG. 5A is a three dimensional view of the combination rotary union and bearing disc, which can also be referred to as a flywheel. FIG. 5B shows the bottom surface of the flywheel. FIG. 5C shows the top surface of the flywheel. FIG. 5D is a sectional view of the flywheel taken along section lines 5D-5D in FIG. 5C. FIG. 5E is a fragmentary side view showing the bearing disc and the top section of the combination rotary union and bearing disc.

FIG. 6A is a three dimensional view of one bearing race. FIG. 6B is a to view of a bearing race. FIG. 6C is a view taken relative to lines 6C-6C in FIG. 6B. FIG. 6D is a detailed view of the profile of one side of the circular race.

FIGS. 7A-7G are views of a circular gear insertable into the circular races shown in FIGS. 6A-6D. FIG. 7A is a three dimensional view of one circular gear. FIG. 7B is to view of one circular gear showing how the gear profiles will radiate from the center. FIG. 7C is aside view of the circular race. FIG. 7D is a detail view of the radiating gear profiles. FIG. 7E is a detailed view of the gear teeth profiles. FIG. 7F is an enlarged detail view of a similar gear profile showing diverging race gear teeth that have a greater width at the outer end than at the inner end. FIG. 7G is also an enlarged detail view of the gear profile of FIG. 7F.

FIGS. 8A-8G show geared or gear bearings that are used with the race and race gears shown in FIGS. 7A-7G. FIG. 8A is a three dimensional view of one geared or gear bearing. FIG. 8B show the profile of the gear teeth. FIG. 8C is a side view of the gear bearing showing how the gear teeth diverge and widen toward the outer end. FIG. 8D also shows the widening of the divergent gears. FIG. 8E is a view of a similar gear bearing showing how the gear teeth widen. FIG.

8F also shows the alternate gear profile of FIG. 8E. FIG. 8G is still another view of the gear profile of FIGS. 8E and 8F. FIGS. 8E-8F are intended to more clearly illustrate the divergent gears of each of the gear bearings employed herein.

FIG. 9 is a view of the drive gear that imparts rotation to the bearing disc when actuated by the hydraulic motor or motors.

FIG. 10A is a three dimensional view of the rotary cap employed in delivering hydraulic fluid to the combination rotary union and bearing disc. FIG. 10B is a sectional view of the rotary cap showing the fluid passages extending through the cap.

DETAILED DESCRIPTION OF THE PREFERRED EMBODIMENT

Figure 1:
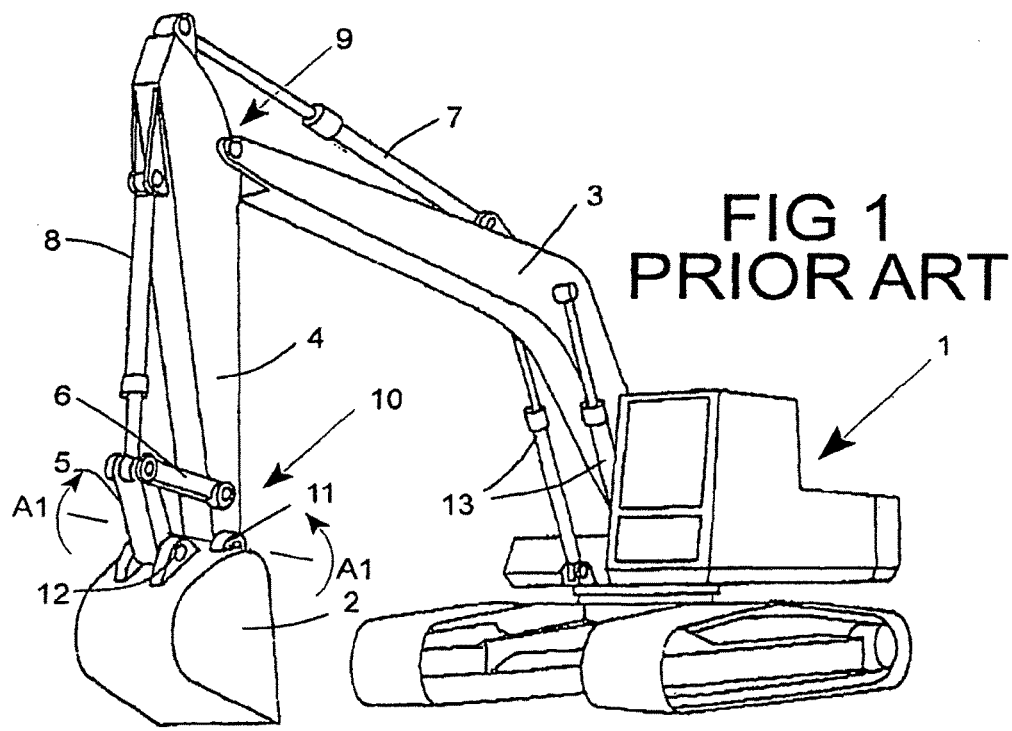
FIG. 1 is a view of a conventional prior art excavator apparatus with which the swivel adapter of the preferred embodiment depicted herein can be employed.

FIG. 1 is a view of a prior art excavator 1 with which the swivel adapter mount or swivel mounting adapter according to this invention can be used to mount implements such as an excavating bucket or claw 2. FIG. 1 shows a crawler type excavator but it should be understood that this excavator is merely representative of other types of excavating equipment.

In particular, the swivel adapter or swivel adapter mount of this invention can be used on a backhoe. With the use of suitable brackets, swivel mounting adapters of this invention can be used on various types of excavating equipment, without modifying the swivel adapter itself.

The prior art crawler type excavator 1, shown in FIG. 1 employs a boom 3 and an articulated main arm 4. A hydraulic arm cylinder 7 and a hydraulic bucket cylinder 8 can be employed to rotate the main arm 4 relative to the boom 3 about an elbow joint 9. Hydraulic cylinders 13 can raise and lower the boom 3. The main arm 4 is attached to the bucket 2 by a wrist joint 10 through a forward bucket pivot 11, so that the bucket 2 can be rotated relative to the arm 4. In order to impart this rotation, an auxiliary arm 5 is also connected to the bucket 2 through a rear bucket pivot 12, and the auxiliary arm 5 is connected to the main arm 4 by a link 6. Reciprocation of a piston in hydraulic cylinder 8 will cause the bucket 2 to rotate about an axis A1-A1, shown in FIG. 1, substantially perpendicular to the main arm 4, though an angle of approximately one hundred eighty degrees, so that the bucket 2 can be used for excavating in a conventional manner. Articulation of the bucket 2 and the main arm 4 is essentially confined to motions parallel to the plane through the centerline of the boom 3, and in a standard excavating apparatus such as the crawler excavator 2, the bucket 2 cannot be swiveled or twisted relative to the main arm 4 or the boom 3. For a crawler excavator 2, the entire apparatus can be turned relative to the crawler tracks, but this movement is normally intended to deposit dirt of other debris to another location after excavation. A backhoe does not normally permit the boom assembly to be turned in this manner.

The instant invention provides a mounting adapter assembly that will allow a bucket or other implement to be swiveled or twisted relative to the main arm 4 of standard excavating equipment or mechanism, such as backhoes and crawler excavators, without requiring modification to the main arm assembly 4 or to the boom 3, other than perhaps mounting additional hydraulic transmission lines or electric wires or transmission lines to power the swiveling adapter. This invention allows a bucket 2 or other implement to be swiveled about an axis that is perpendicular to the normal bucket manipulation axis A1-A1. A bucket 2 or similar implement can also be swiveled about and axis generally along the length of the excavator main arm 4, by employing a swivel adapter mounted between the main arm 4 and the bucket or implement 2. Only minor modifications, if any, need be made to standard implements or other mechanisms, such as buckets. U.S. patent application Ser. No. 13/530,324 filed Jun. 22, 2012, of which this application is a continuation in part, discloses embodiments of a swivel adapter of this type and this application is incorporated herein by reference. The swivel adapter 20 disclosed herein incorporates the same essential components and operates much the same as embodiments thereby incorporated herein by reference. The preferred embodiment of the swivel adapter 20 described herein, also incorporates components that will allow greater forces and greater loads to be applied to the swivel adapter 20 as the excavator device 1 is employed in heavy duty operations. Although this preferred embodiment is described with reference to its use an earth moving excavator device 1, it should be understood that the swivel adapter 20 can be employed with other devices and implements to permit rotation of the implement relative to the device.

Figure 2:
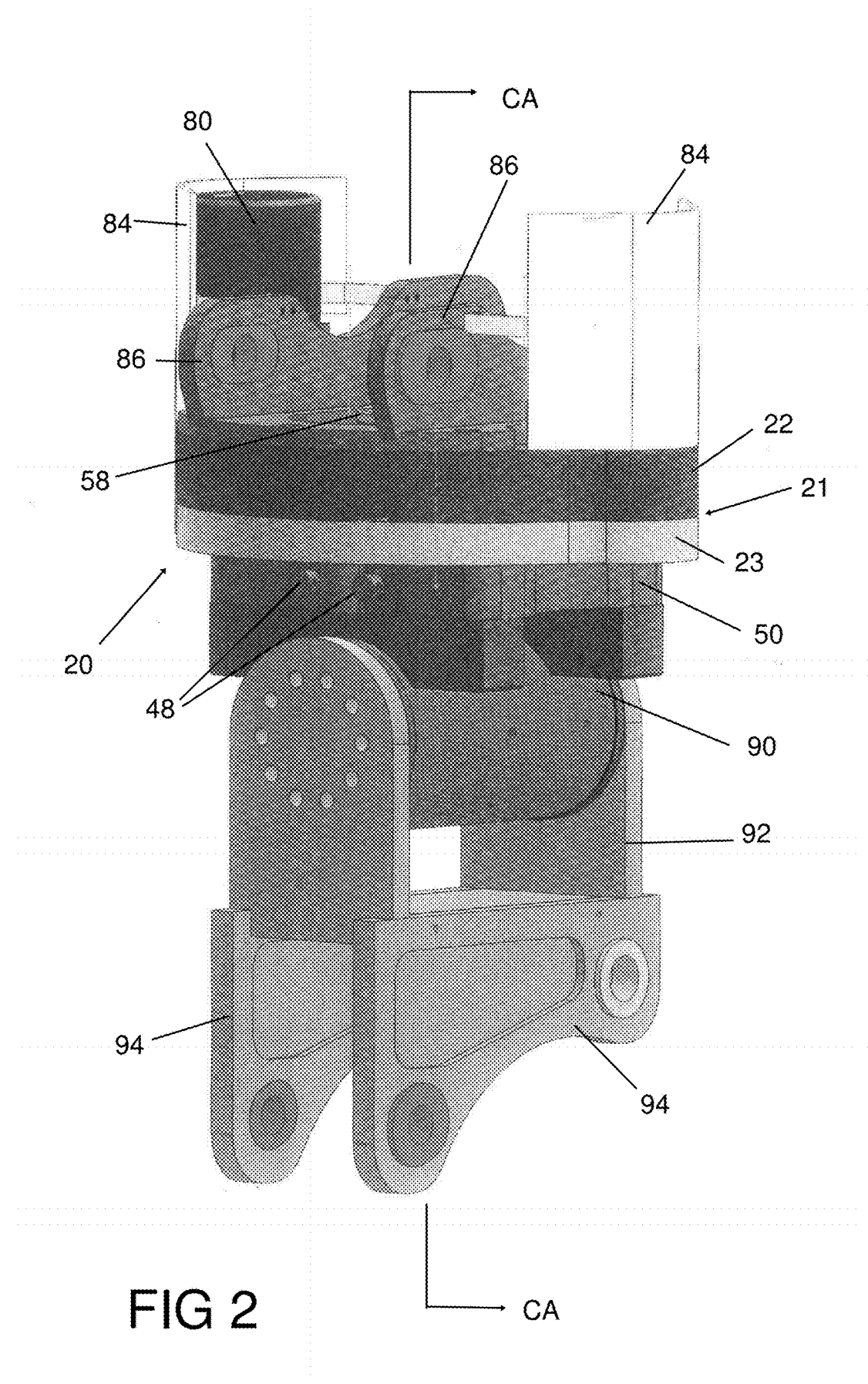
FIG. 2 is a view of the swivel adapter comprising the preferred embodiment of this invention and would be employed with an excavator device and an implement, such as a bucket, so that the implement can be swiveled relative to the device without interfering with rotation of the bucket about other axes.
Figure 3A:
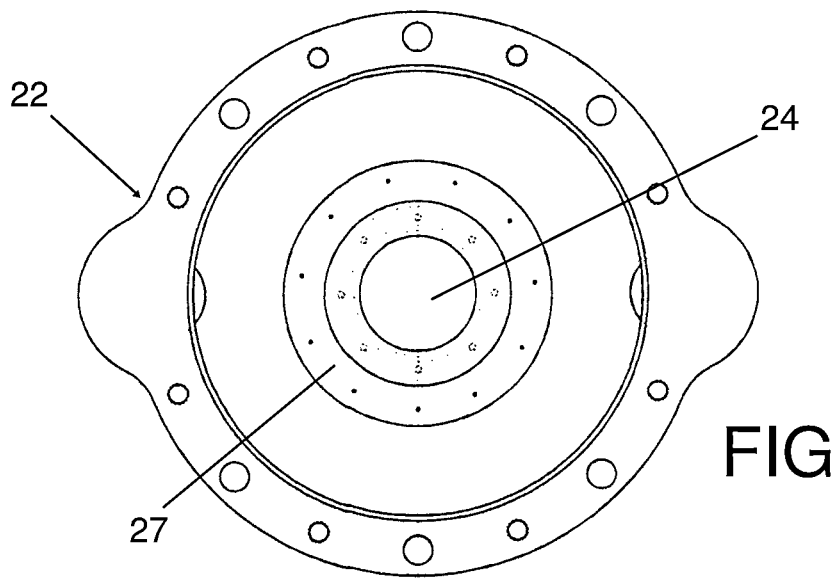
FIG. 3A-3C are views of the swivel adapter top housing.
Figure 3B:
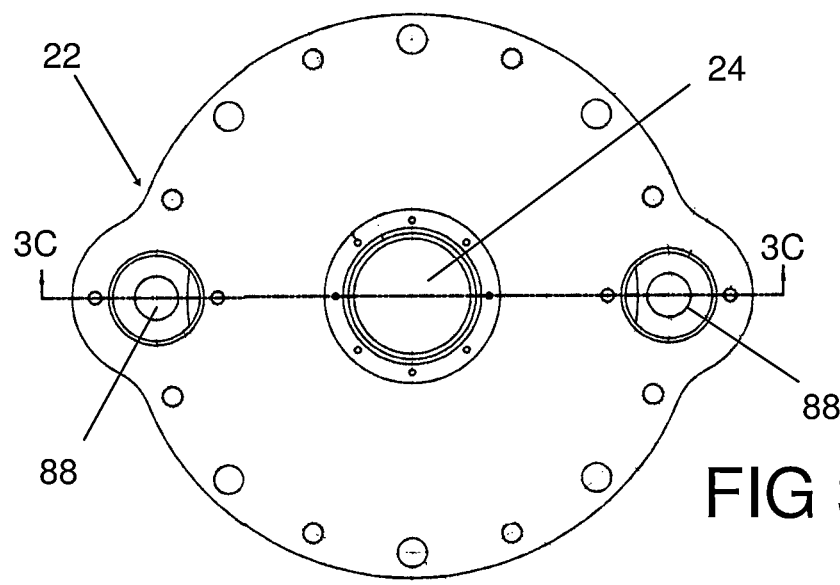
Figure 3C:
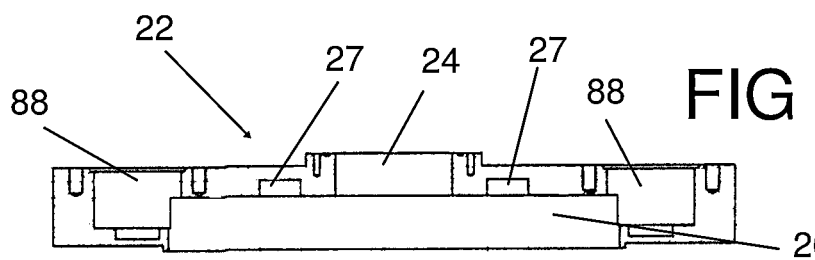
Figure 4A:
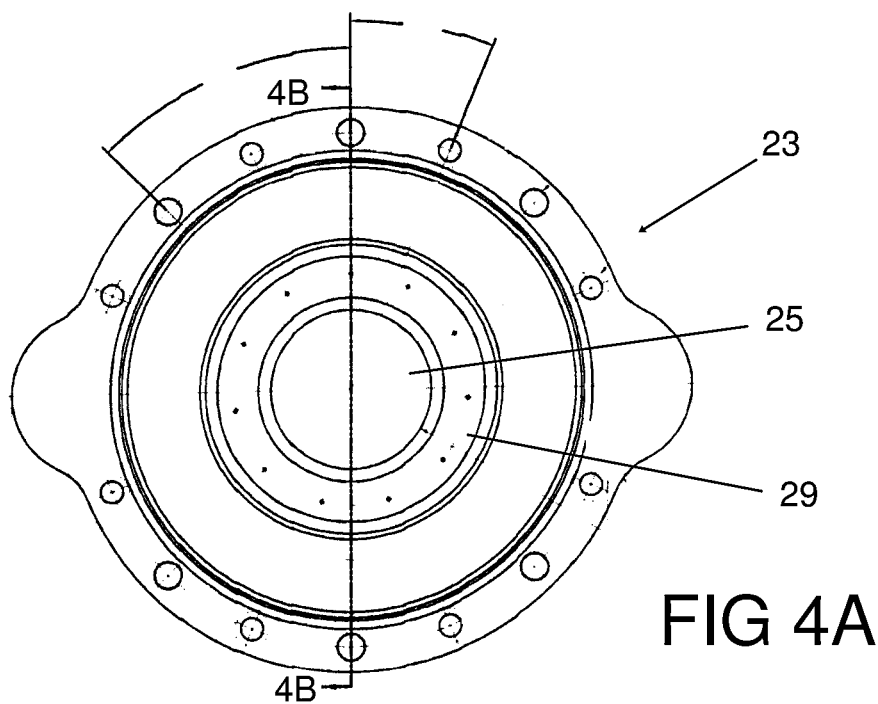
FIGS. 4A and 4B are views of the swivel adapter bottom housing which is attached to the top housing.
Figure 4B:
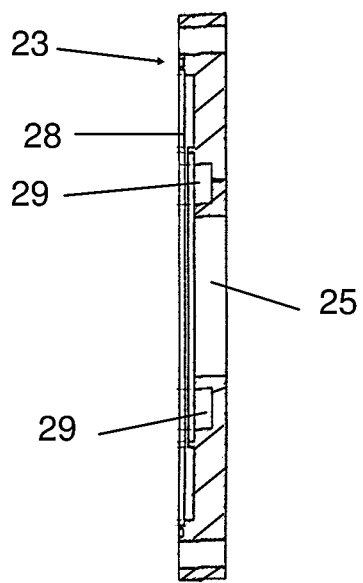
Figure 5B:
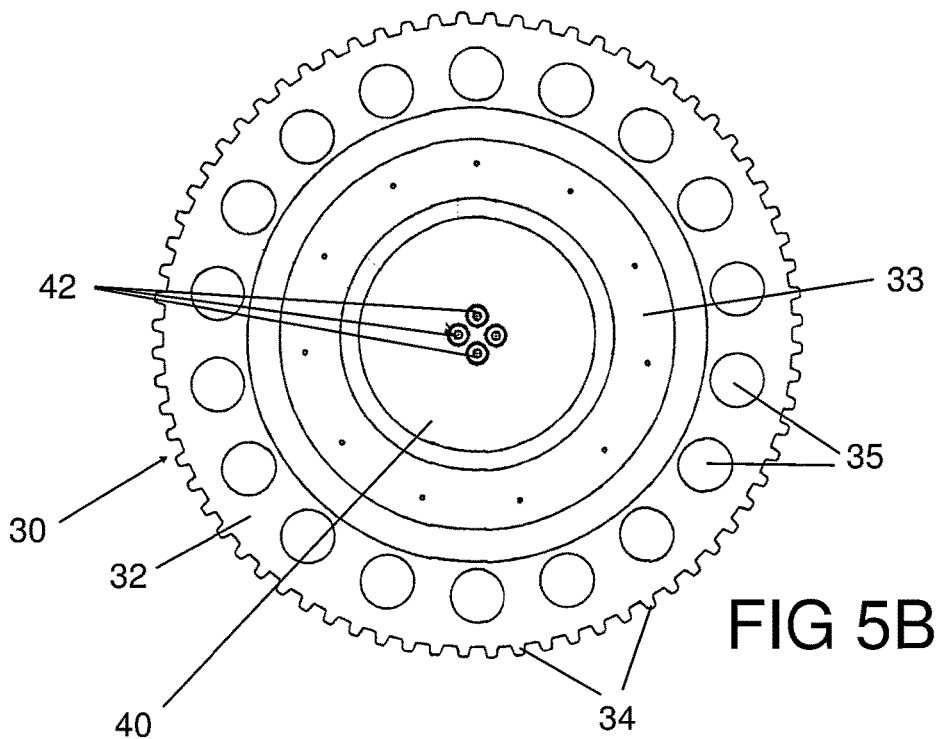
Figure 5A:
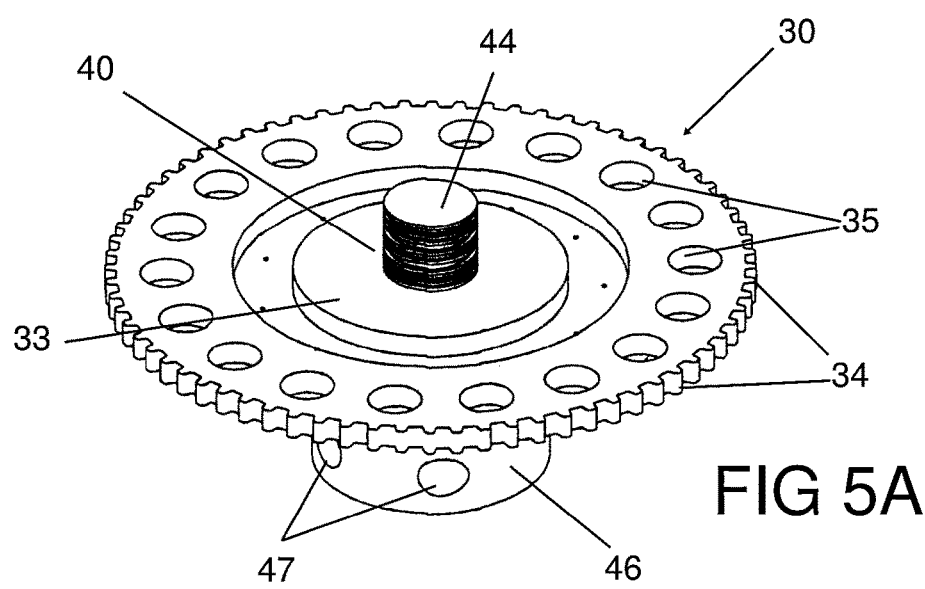
Figure 6B:
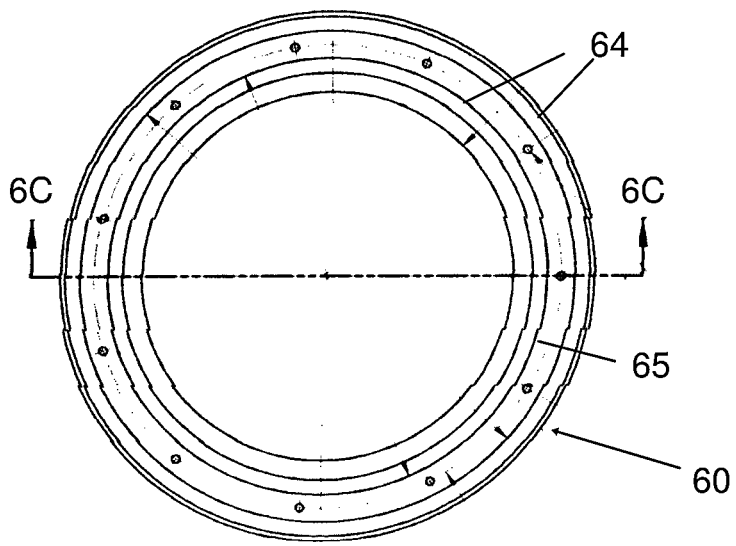
FIGS. 6A-6D show one of a six substantially identical circular bearing races that are to be attached the bearing disc and the top and bottom housing.
Figure 6D:
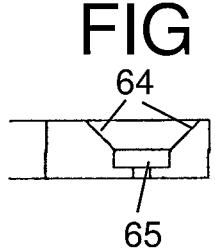
Figure 6C:
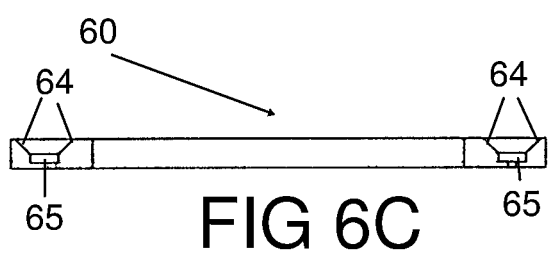
Figure 6A:
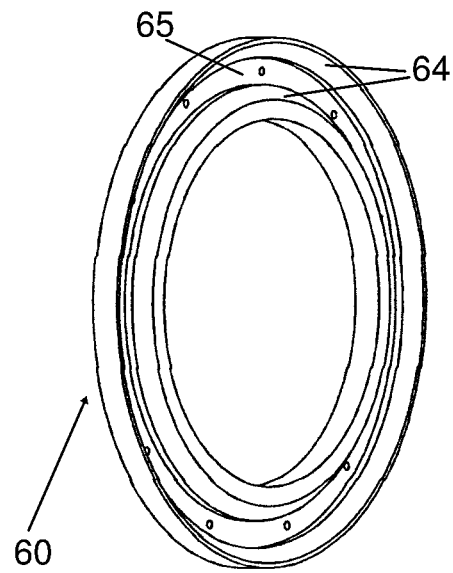
Figure 7F:
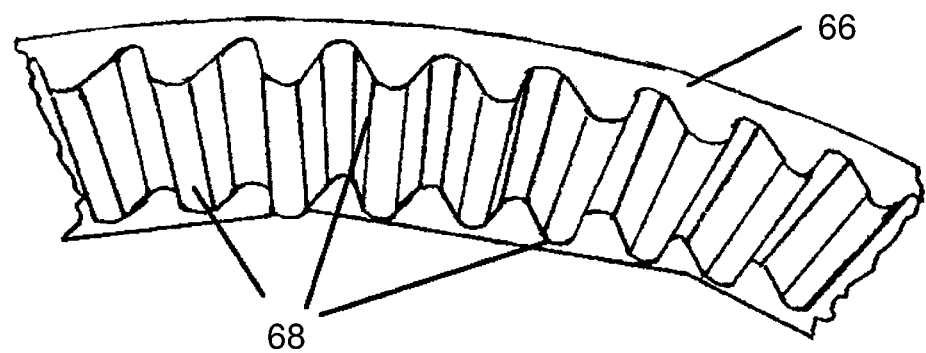
Figure 7G:
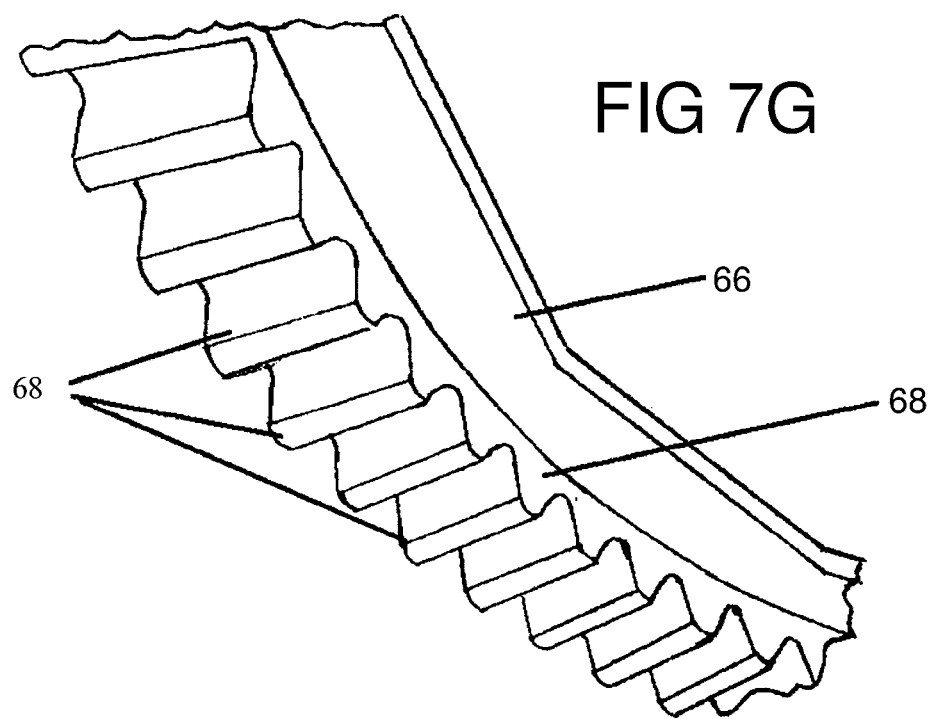
Figure 13:
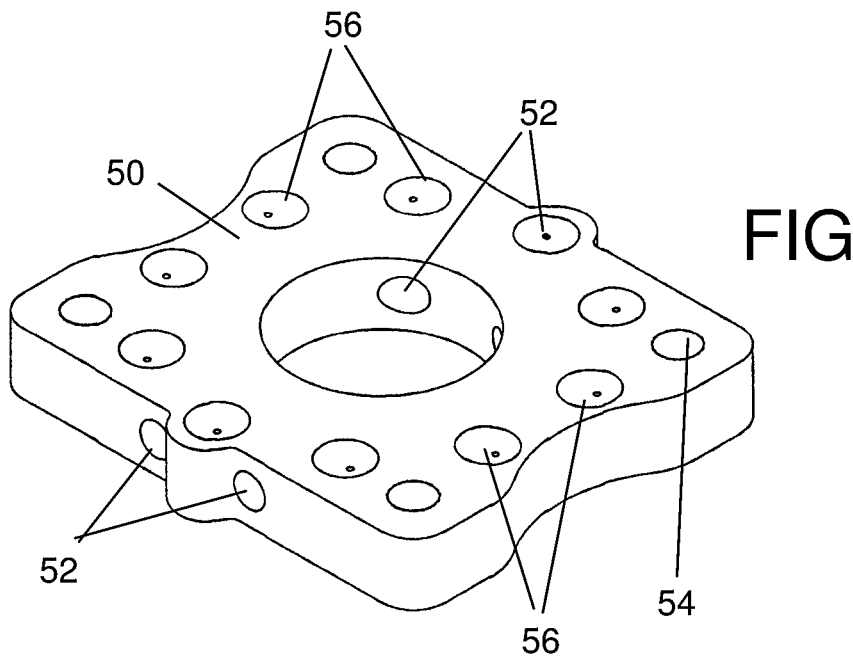
FIG. 13 is a view of the mounting plate that attaches the shaft of the combination rotary union and bearing disc to the implement through the auxiliary hydraulic actuator.
Figure 14:
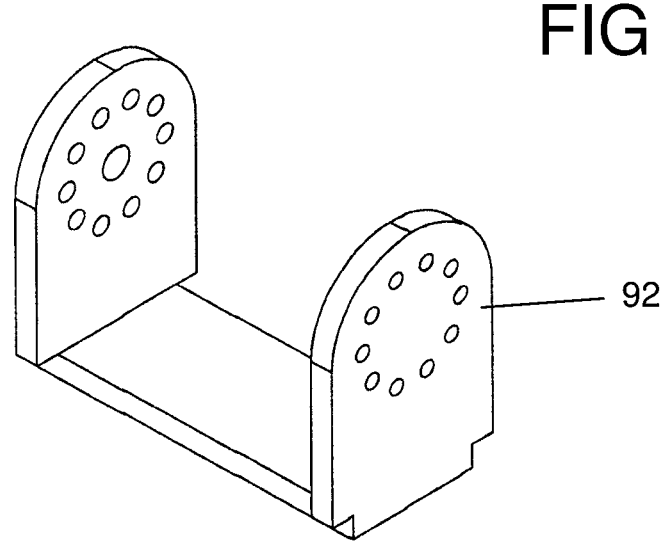
FIG. 14 is a view of the yoke or saddle on which the auxiliary hydraulic adapter is mounted.

Swivel adaptor apparatus 20, shown in FIG. 2 is mounted between the main arm 4, comprising a part of the excavator device 1 and the bucket or implement 2. This swivel adapter apparatus 20 will allow an implement mounted on the bottom of the swivel adapter apparatus 20 shown in FIG. 2 to be rotated about a Central Axis CA-CA relative to a device on which the swivel adapter apparatus 20 is mounted at the top of FIG. 2. Swivel adapter apparatus 20 has a housing 21, which further comprises a top housing 22 and a bottom housing 23, which are attached together by studs or bolts. Detailed views of the top housing are shown in FIGS. 3A-3C. Detailed views of the bottom housing 23 are shown in FIGS. 4A and 4B. A combination rotary union and bearing disc 30 (not visible in FIG. 2) is mounted between top housing 22 and bottom housing 23. Detailed views of the combination rotary union and bearing disc 30 are shown in FIGS. 5A-5E. A mounting plate 50 is positioned below the bottom housing. This mounting plate 50 is attached to a shaft section 40 comprising part of the combination rotary union and bearing disc 30. This mounting plate 50 will rotate relative to the housing 21. Details of this mounting plate 50 are shown in FIG. 13. At least one swivel hydraulic motor 80 is mounted on the top of the housing 21. In the preferred embodiment two swivel hydraulic motors 80 are employed, although one of these motors 80 is obscured by one of the debris shields 84 in FIG. 2. These swivel hydraulic motors 80 are conventional hydraulic motors of the type that can be employed in construction equipment. In the preferred embodiment a Parker Hydraulic Motor Gerotor, fixed displacement hydraulic motor serial number TG0335AS030AAAB can be employed, although it should be understood that other hydraulic motors or actuators could be employed. The swivel adaptor apparatus 20 is attached to a boom main arm 4 by top mounting brackets 86.

FIG. 2 also shows a bucket pivoting actuator or auxiliary actuator 90 mounted on an actuator saddle 92, which is attached to mounting plate 50, and is positioned between the swivel adaptor apparatus 20 and a bucket or other implement 2. A Helac hydraulic actuator is used in the preferred embodiment of this invention, although other hydraulic actuators could be employed. Bucket mounting brackets 94 attach the bucket pivoting actuator 90 to the bucket 2. This bucket actuator 90 is a hydraulic actuator that will be employed to rotate a bucket or implement 2 about axis A1-A1, which will be perpendicular to central axis CA-CA. Thus the bucket or implement 2 can be rotated about two perpendicular axes at the same time, and in combination with the movement of the excavator 1 and the boom 3 and boom main arm 4 will allow the bucket 2 or any other implement to be manipulated into any orientation relative to the horizontal and the vertical within the reach of the excavator apparatus 1. The swivel adaptor 2 allows rotation about central axis CA-CA, which is not possible with conventional prior art excavation apparatus such as that shown in FIG. 1.

The combination rotary union and bearing disc 30 includes a shaft 40 and a bearing disc 32 that extends around the shaft 40 and which as a thickness that is substantially less than the height of the shaft section 40. In the preferred embodiment the combination rotary union and bearing disc 30 comprises a one piece member that can be machined from or a metal that will suitably withstand the loads applied to the apparatus. It should be understood that this combination rotary union and bearing disc 30 can be fabricated as a separate shaft and bearing disc, which may be affixed to each other during assembly, and that the combination rotary union and bearing disc 30 is not to be limited to a one-piece member unless referred to as such. The lower part of the shaft forms a shaft implement hub 46 to which the mounting plate 50 can be attached. When the shaft 40 is rotated about the central axis CA-CA, which coincides with the shaft axis, the mounting plate 50 and the implements mounted thereon will rotate about the central axis CA-CA relative to the housing 21. Since the housing 21 will be attached to the boom main arm 4, the implement, such as bucket 2, will rotate relative to the boom also about the axis CA-CA.

When the top housing 22 is assembled to the bottom housing 23, and internal recess, sufficient to receive the flywheel or combination rotary union and bearing disc 30 will be formed by a top housing cavity 26 and a bottom housing cavity 28 on the interior surfaces of the two components that, when joined, will form the housing 20. A central hole 24 extends through top housing 22 and communicates with the recess formed within housing 20 formed by the opposed cavities 26 and 28. This central hole 24 will receive a hydraulic input projection 44 at the upper end of the shaft 40 on the flywheel 30. A shaft hole 25 on the bottom housing will allow the shaft implement hub section 46 to extend therethrough so that the mounting plate 50 can be attached to the shaft 40.

A circular channel 27 extends upwardly from the cavity 26 on the top housing. Similarly a circular channel 29 extends downwardly from the cavity 28 on the bottom housing. These circular channels 27 and 29 extend around the central axis CA-CA and each of these channels has the same mean diameter. These channels 27 and 29 will receive bearing races 60 in a manner that will be subsequently discussed in greater detail.

The bearing disc portion 32 of the combination rotary union and bearing disc 30 has circular disc channels 33 on the upper and lower surfaces of the bearing disc 32, which have the same diameter relative to the central axis CA-CA of the shaft 40 as the circular channels 27 and 28. The channels 33 will also receive bearing races 60 so that opposed bearing races 60 will face each other both above and below the bearing disc 30 when the components are in an assembled configuration. When the combination rotary union and bearing disc 30 is positioned between the assembled top housing 22 and bottom housing 23, the disc channels 33 are aligned with and opposed to the housing channels 27 and 29.

The channels 27, 29 and 33 will each receive a bearing race 60, and a circular race gear 66 will be positioned in each circular bearing race 60. The circular race gear 66, the bearing race 60 and a plurality of rotatable geared or gear bearings 70 will form bearing assemblies. A circular race 60 with a circular gear 66 positioned in one of the housing channels 27 or 29 will form a housing bearing assembly. A circular race 60 with a circular gear 66 positioned within a bearing disc channel 33 will form a bearing race assembly. Components of these bearing race assemblies are shown in FIGS. 6A-6D, FIGS. 7A-7F, and FIGS. 8A-8G.

Each circular race 60 has opposed inclined bearing surfaces 64 on opposite sides of a circular grove 65 in which a circular gear 66 will be positioned. The angle of each inclined bearing surface 64, relative to the vertical will be forty-five (45) degrees in the preferred embodiment, but it should be understood that other inclinations can be employed. Each circular gear 66 has evenly spaced radially diverging race gear teeth 68 extending therearound. The race gear teeth 68 are formed along radial projections extending from the center of the circular gear 66. When mounted in the races 60 and on the bearing disc 32 or the housing parts 22 and 23, the center of the circular gear 66 will be defined by the intersection with the central axis CA-CA. Since the race gear teeth 68 are formed by radial projections, each of the race gear teeth 68 will be wider along the outer periphery of the circular race gear 66 than along the inner periphery of the circular race gear 66. Thus the race gear teeth 68 can be described as radially diverging. This radially diverging shape is important in insuring that there if limited if any slippage between the race gear teeth 68 and the divergent geared bearing teeth 76 on the rotatable gear or geared bearings 70.

Figure 8B:
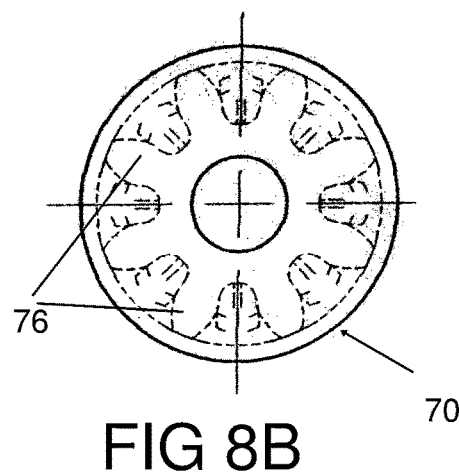
Figure 8A:
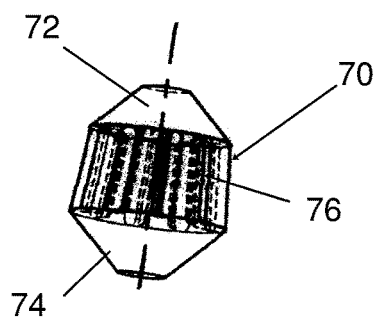
Figure 8C:
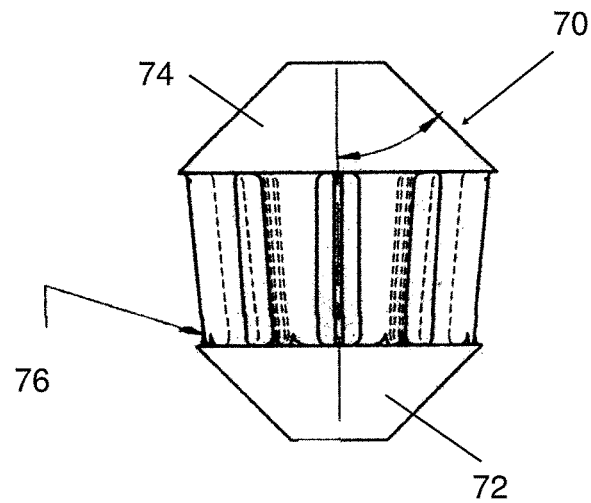
Figure 8D:
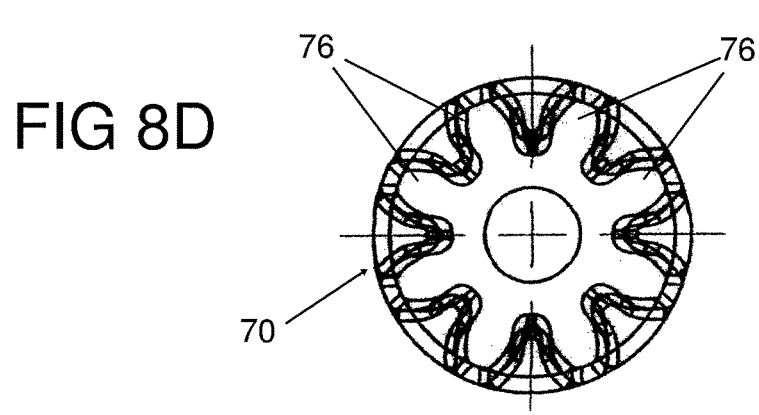
Figure 11:
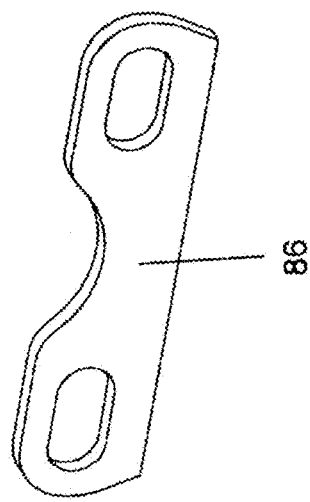
FIG. 11 is a view of the mounting bracket that attaches the housing to the boom.
Figure 12:
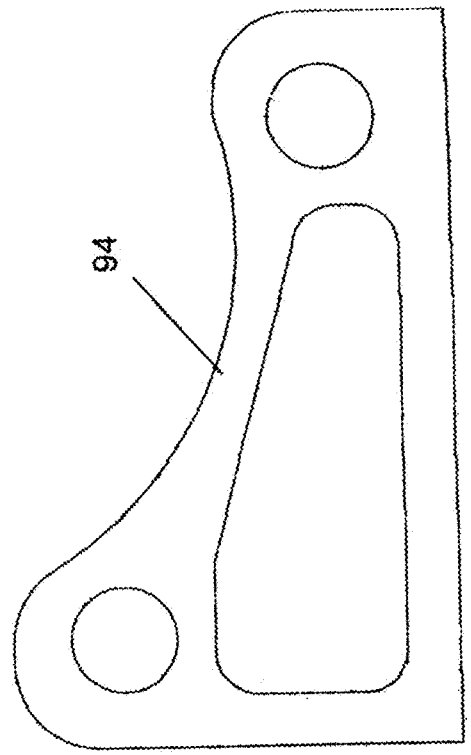
FIG. 12 is a view of the bracket that attaches the bucket or other implement to the swivel and tilting adapter.

The individual geared or gear bearings 70 that are disposed around the opposed races in the bearing disc 32 and the two housing components 22 and 23 are shown in FIGS. 8A-8G. The axis of rotation of each gear bearing 70 will extend perpendicular to the central axis CA-CA, and the gear bearing axes of rotation will extend along radial projections intersection this central axis. These gear bearing axes of rotation will thus extend generally parallel to the interior faces of the housing parts 22 and 23, and to the plane of the bearing disc 32. None of the axes of rotation of the gear bearings 70 will be parallel to the any of the other gear bearings 70. Each of these bearings 70 has an inner conical bearing surface 72 and an outer conical bearing surface 74 located at the two opposite ends of the gear bearing 70. As can be seen in FIG. 8C, the maximum diameter of the outer conical gear bearing surface 74 is greater than the maximum diameter of the inner conical gear bearing surface 72. As seen in FIGS. 8A-8G, the gear teeth are recessed relative to the oppositely facing conical bearing surfaces, which project beyond the gear teeth. The maximum diameter of the divergent gear bearing teeth 76 will also be greater by distance d, as shown in FIG. 8D, at the intersection with the outer conical bearing surface 74 than at the intersection of the gear bearing teeth 76 with the inner conical bearing surface 72. The width of the individual gear bearing teeth 76 will also be greater at their outer end than at the inner end of the diverging gear bearing teeth 76. FIGS. 8E and 8F show that the width 76a of the gear teeth at their inner end is less than the width 76b at the outer end of the gear bearing. The divergent gear bearing teeth 76 will thus mesh with the radially diverging race gear teeth 68 on the circular race gear 66. This will allow rotational movement of the gear bearings 70 and the bearing disc 32 relative to the housing 21. The engagement of the divergent gear bearing teeth 76 with the diverging race gear teeth 68 will also cause the gear bearings 70 to rotate as the bearing disc 32 rotates relative to the housing 21. This positive rotation imparted to the gear bearings 70 will cause the gear bearing conical bearing surfaces 72, 74 to rotate relative to the inclined bearing surfaces 64 on the races 60, so the bearing surfaces will not slide causing wear and damage to the bearing components. Relatively large loads that would be encountered in applications such as earth moving will not therefore cause damage to the bearings or the races. These bearings can also be employed in the presence of debris or dirt as would be encountered in applications, such as earth moving and excavation.

When rotation of the bearing disc 32 is imparted relative to the housing 21, the swivel adapter 20 causes the implement, such as a bucket 2, to swivel or rotate about the central axis CA-CA relative to the excavator boom arm 4 to which the housing 21 is attached. Rotation of the bearing disc 32 is imparted by the hydraulic swivel motor or motors 80 mounted on the housing 20. These motors are connected to hydraulic lines and to a source of hydraulic pressure, not shown, on the excavator device 1 or on some other device with which the swivel adapter 20 is to be used. The preferred embodiment uses hydraulic pressure to swivel the implement relative to the otherwise stationary device on which it is employed. It should be understood, however, that some other fluid actuation source, such as a pneumatic source, could also employ a swivel adapter 20 according to this invention.

Fluid pressure motor or motors 80 impart rotation to the bearing disc through a swivel drive gear 82 rotated by the motor 80, which in turn engages a driven gear 34 extending around the periphery of the bearing disc 32. Drive gears 82 are located in the openings 88 located on opposite sides of the top housing 22, as shown in FIG. 3B. Shields or guards 84 located on the exterior of the motors 80 prevent damage to the motors 80 due to impact when the device is moved as wells as debris unearthed during excavating and other operations.

The swivel adapter 20 does permit the implement to swivel relative to the device on which it is mounted. In the representative embodiment depicted herein, an auxiliary or bucket fluid pressure or hydraulic pressure actuator 90 is mounted between the swivel adapter 20 and the implement, such as bucket 2. The actuator 90 is mounted to the swivel adapter 20 by the mounting plate 50, and rotation of the shaft 40 causes both the mounting plate 50 and the actuator 90 to swivel. Standoffs in the form of buttons fabricated from a material having a low coefficient of friction can be mounted on top of the mounting plate to limit friction between the mounting plate and the bottom housing 23. Hard bronze button 56 can be mounted in mounting plate button holes 54 and will not only reduce friction, but also will stabilize devices mounted on mounting plate 50. When differential hydraulic pressure is applied to actuator 90 it will rotate the implement, which is attached to the auxiliary actuator 90 by a yoke or saddle 90, which is in turn attached to the implement or bucket 2 by bucket mounting ears or brackets 94. In the embodiment depicted in FIG. 2, the hydraulic actuator 90 will impart rotation to the implement, such as a bucket, about an axis that is perpendicular to the axis CA-CA about which the swivel adapter will cause the implement to rotate. The bucket actuator 90 will also cause rotation that is perpendicular to axis A1-A1 as shown in the prior art excavator 1 shown in FIG. 1. The bucket actuator 90 will cause the bucket 2 to tilt relative to the ground when activated.

In order for the bucket or tilt actuator 90 to manipulate the bucket 2, fluid pressure or hydraulic fluid must be supplied to the actuator 90. A pressure control manifold or controller (not shown) can be mounted on the excavator boom to provide control of the hydraulic fluid pressure supplied to the rotary motors 80, as well as to the tilt actuator 90. Since the excavator device 1 is the source of pressurized hydraulic fluid, this fluid must pass through the swivel adapter 20, which is located between the auxiliary actuator 90 and the boom of the excavator device 1. The shaft 40, which with the bearing disc 32 forms the combination rotary union and bearing disc 30, includes fluid passages 42, which extend from the top to the bottom of the shaft section 40. These fluid passages 42 are seen in the section view of FIG. 5D. A rotary cap 58, shown in FIGS. 10A and 10B is attached to the top housing 22, and this rotary cap 58 extends over the hydraulic input projection 44. Standard fluid lines on the excavator 1 are attachable to the rotary cap 58 on the top face of cap 50. Fluid passages in the rotary cap 58 communicate with the space between the rotary cap 58 and the input hydraulic projection 44 on the shaft portion 40 of the combination rotary union and bearing disc 32. O-ring grooves extend around the input hydraulic projection 44. Fluid lines can be connected at the bottom of shaft 40, and these fluid lines can then be attached to the auxiliary or bucket actuator 90. Since conventional fluid lines are flexible, these lines will not prevent the shaft 40 from rotating when a force due to a hydraulic pressure differential is applied to the bearing disc 32 by the hydraulic swivel motor or motors 80 to in turn impart rotation to the shaft 40.

The representative embodiment of this invention is intended for use on an excavator boom and with an implement, such as an excavator bucket. This invention is not, however, limited to this representative implementation. The invention is defined, not be the specific embodiment depicted herein for representation purposes, but is instead defined by its claims.

I claim:

1. A gear bearing assembly for use between two rotating members, the gear bearing assembly comprising first and second raceways, each including raceway gears and oppositely inclined raceway bearing surfaces and a plurality of gear bearings between the first and second raceways, wherein;
   the gear bearings comprise gear teeth extending around the gear bearings between oppositely facing conical gear bearing surfaces, which project beyond the gear teeth extending radially inward relative to the oppositely facing conical bearing surfaces, individual gear teeth having a thickness at one end that is greater than the thickness at an opposite end.

2. The gear bearing assembly of claim 1 wherein opposite surfaces defining the individual gear teeth diverge between opposite ends of the gear teeth.

3. The gear bearing assembly of claim 1 wherein a first diameter of the gear bearing adjacent the gear tooth end having the larger width is greater than a second diameter of the gear bearing adjacent the gear tooth end having the relatively smaller width.

4. The gear bearing assembly of claim 1 wherein the raceway bearing surfaces and the gear bearing surfaces are crowned.

5. The gear bearing assembly of claim 1 wherein bearing surfaces on the gear bearings extend beyond opposite ends of the gear teeth.

6. The gear bearing assembly of claim 1 wherein grooves forming the gear teeth extend between portions of the bearing surface on the gear bearing.

7. The gear bearing assembly of claim 1 wherein the bearing surface on at least one end of the gear bearings comprises a continuous conical surface.

8. The gear bearing assembly of claim 7 wherein the gear bearings comprise a conical member forming the bearing surface bonded to a portion of the gear bearings on which the gear teeth are located.

9. The gear bearing assembly of claim 7 wherein the gear bearings each comprise a one piece member.

10. The gear bearing assembly of claim1 wherein the gear bearings each comprise a one piece member.

11. The gear bearing assembly of claim 1 wherein the raceway gears have a thickness at an outer end greater than at and inner end.

12. The gear bearing assembly of claim 1 wherein the raceway gears extend radially.

13. The gear bearing assembly of claim 1 wherein raceway bearing surfaces are located on opposite ends of the raceway gears, inclination of one raceway bearing surface differing from inclination of the other raceway bearing surface.

14. The gear bearing assembly of claim 13 wherein the raceway bearing surface adjacent an outer end of the raceway gears has a greater inclination than the raceway bearing surface adjacent an inner end of the raceway gears.

15. The gear bearing assembly of claim 1 wherein the raceway gears are formed on a raceway gear ring.

\* \* \* \* \*